United States Patent
Takashi et al.

(10) Patent No.: US 7,306,140 B2
(45) Date of Patent: Dec. 11, 2007

(54) INTEGRATED CIRCUIT CARD SYSTEM AND METHOD THEREOF

(75) Inventors: Kikuchi Takashi, Seoul (KR); Joong-Chul Yoon, Seoul (KR); Jong-Sang Choi, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 224 days.

(21) Appl. No.: 11/047,570

(22) Filed: Feb. 2, 2005

(65) Prior Publication Data

US 2005/0263581 A1    Dec. 1, 2005

(30) Foreign Application Priority Data

May 29, 2004   (KR) .................... 10-2004-0038709

(51) Int. Cl.
*G06F 17/00* (2006.01)
(52) U.S. Cl. .................... 235/375; 235/476
(58) Field of Classification Search ............ 235/375, 235/376, 437, 487
See application file for complete search history.

(56) References Cited

U.S. PATENT DOCUMENTS 6,473,794 B1 * 10/2002 Guheen et al. ............ 709/223
2005/0160217 A1 * 7/2005 Gonzalez et al. ............ 711/6

FOREIGN PATENT DOCUMENTS

| JP | 56-98800 A | 8/1981 |
| JP | 5-282857 A | 10/1993 |
| JP | 2000-207288 A | 7/2000 |

* cited by examiner

*Primary Examiner*—Daniel Stcyr
(74) *Attorney, Agent, or Firm*—Harness, Dickey & Pierce, P.L.C.

(57) ABSTRACT

An integrated circuit card system and method are disclosed. The integrated circuit card system may include a host and a memory card for storing test data transferred from the host. The host may transfer the test data to the memory card when a processing time of the memory card exceeds a reference time. The memory card may calculate the test data transferred from the host, and the host may read out the calculated test data.

43 Claims, 3 Drawing Sheets

INTEGRATED CIRCUIT CARD SYSTEM AND METHOD THEREOF

This U.S. non-provisional application claims priority under 35 U.S.C. § 119 to Korean Patent Application No. 2004-38709, filed on May 29, 2004 in the Korean Intellectual Property Office, the contents of which are incorporated by reference herein in their entirety.

BACKGROUND OF THE INVENTION

1. Field of the Invention

Example embodiments of the present invention relate generally to an integrated circuit card system, and more particularly, to a memory card system.

2. Description of Related Art

Generally, a typical plastic card (e.g., a magnetic card) may have a magnetic strip which may not have enough capacity to store large amount of data and may be vulnerable to security. However, with the advances in semiconductor technologies, the use of integrated circuits made it possible to store large amount of data in plastic cards. For this reason, integrated circuit cards (hereinafter referred to as "IC cards") may have been developed by combining plastic cards with integrated circuits. Because IC cards (or memory cards) may be capable of storing more data, IC cards have been widely used, such as in the banking and insurance industries.

A memory card may set a ready/busy signal to a busy state when a command is inputted from a host. When operations corresponding to the input command are all completed, the memory card may then reset the ready/busy signal to a ready state. The host may check a processing situation of the memory card using the ready/busy signal. However, a conventional memory card may encounter disadvantages.

For example, when a ready/busy signal indicates a busy state even if a processing time of a memory card exceeds a reference time (or maximum processing time of a card), the host may not determine whether the memory card continues to perform operations corresponding to a transmitted command or in an abnormal state (or stack state). The host may initialize the memory card to perform the next operation of the memory card. However, although the memory card may continue to operate that may correspond to the transmitted command, the memory card may be initialized (e.g., reset).

SUMMARY OF THE INVENTION

Example embodiments of the present invention may provide an integrated circuit card system. The integrated circuit card system may include a host and a memory card for storing test data transferred from the host. The host may transfer the test data to the memory card when a processing time of the memory card exceeds a reference time. The memory card may calculate the test data transferred from the host. The host may read out the calculated test data.

In other, example embodiments, the memory card may further include a register configured for storing the test data, and a controller for calculating the test data stored in the register and storing the calculated test data in the register.

In other example embodiments, the memory card may further include a memory controlled by the controller and storing data transferred from the host.

In other example embodiments, the memory may be a flash memory.

In other example embodiments, the memory card may further include a status register for outputting a ready/busy signal.

In other example embodiments, when a command is transferred from the host to the memory card, the status register may be set by the controller such that the ready/busy signal indicates a busy state.

In other example embodiments, the controller may include a central processing unit (CPU), a security data processor, a read only memory (ROM), a random access memory (RAM), and an input/output interface circuit.

In other example embodiments, the register may be configured for generating an interrupt signal when the test data is stored.

In other example embodiments, the CPU may calculate the test data in response to the interrupt signal and stores the calculated data in the register.

In other example embodiments, the security data processor may calculate the test data in response to the interrupt signal and stores the calculated data in the register.

In other example embodiments, the host may determine whether the calculated data may be identical to expected data to determine a normal or abnormal state of a processing situation of the memory card.

In other example embodiments, the host may initialize the memory card when the processing situation of the memory card is determined to be in the abnormal state.

In other example embodiments, the host may transfer the test data to the memory card whenever the processing time of the memory card exceeds the reference time.

In other example embodiments, the register may be controlled by the host and the controller.

Example embodiments of the present invention may provide a memory card. The memory card may include a register configured for storing test data, a controller for calculating the test data stored in the register and storing the calculated test data in the register and a memory for storing data transferred from a host.

In other example embodiments, the memory may be controlled by the controller.

In other example embodiments, the register may be configured for generating an interrupt signal when the test data is stored.

In other example embodiments, the memory card may further include a status register for outputting a ready/busy signal.

In other example embodiments, when a command is transferred from the host to the memory card, the status register may be set by the controller such that the ready/busy signal indicates a busy state.

In other example embodiments, the controller may include a central processing unit (CPU), a security data processor, a read only memory (ROM), a random access memory (RAM), and an input/output interface circuit.

In other example embodiments, the CPU may calculate the test data in response to the interrupt signal and stores the calculated data in the register.

In other example embodiments, the security data processor may calculate the test data in response to the interrupt signal and stores the calculated data in the register.

In other example embodiments, the register, the controller, the memory and the status register may be connected through a bus.

Example embodiments of the present invention may include a method for determining a processing state of an integrated circuit card system. The method may include transferring a command and data to be stored from a host to a memory card, determining whether a processing time of the memory card exceeds a reference time after the command is transferred to the memory card, transferring test data to the memory card when the processing time of the memory card exceeds the reference time, and determining whether the calculated test data is identical to expected data.

In other example embodiments, the memory card may set a ready/busy signal to a busy state when the command is transferred.

In other example embodiments, when the calculated test data is not identical to the expected data while the ready/busy signal is kept in the busy signal, the memory card may be determined to be abnormal and may be initialized.

In other example embodiments, the reference time may be set by a host.

In other example embodiments, the reference time may be set by the memory card.

In other example embodiments, the test data may be stored in a register of the memory card.

In other example embodiments, a controller may read out the test data stored in the register and calculates the read-out data in the register.

In other example embodiments, determining whether the calculated test data is identical to expected data may be performed by a host.

In other example embodiments, the method further includes re-setting the memory card when the calculated data read out from the register is not the expected data.

In other example embodiments, the method further includes determining whether a processing time of the memory card exceeds a reference time after the test data is calculated.

In other example embodiments, when the processing time of the memory card exceeds the reference time, the operation may proceed to writing a test data in the memory card.

In other example embodiments, when the processing time of the memory card does not exceed the reference time, the operation may be repeated.

Example embodiments of the present invention may provide a method for determining a processing situation of a memory card. The method may include determining whether a processing time of the memory card exceeds a reference time after a command is transferred to the memory card, transferring test data to the memory card when the processing time of the memory card exceeds the reference time, the test data being calculated by the memory card, and determining whether the calculated test data is identical to expected data.

BRIEF DESCRIPTION OF THE DRAWINGS

Example embodiments of the present invention will be readily understood with reference to the following detailed description thereof provided in conjunction with the attached drawings in which.

DETAILED DESCRIPTION OF EXAMPLE EMBODIMENTS

Example embodiments of the present invention will now be described more fully hereinafter with reference to the accompanying drawings, in which example embodiments of the invention are shown. However, it should be appreciated that the invention may be embodied in many different forms and should not be construed as being limited to the embodiments set forth herein; rather, the example embodiments are provided so that this disclosure will be thorough and complete, and will fully convey the concept of the invention to those skilled in the art.

Figure 1:
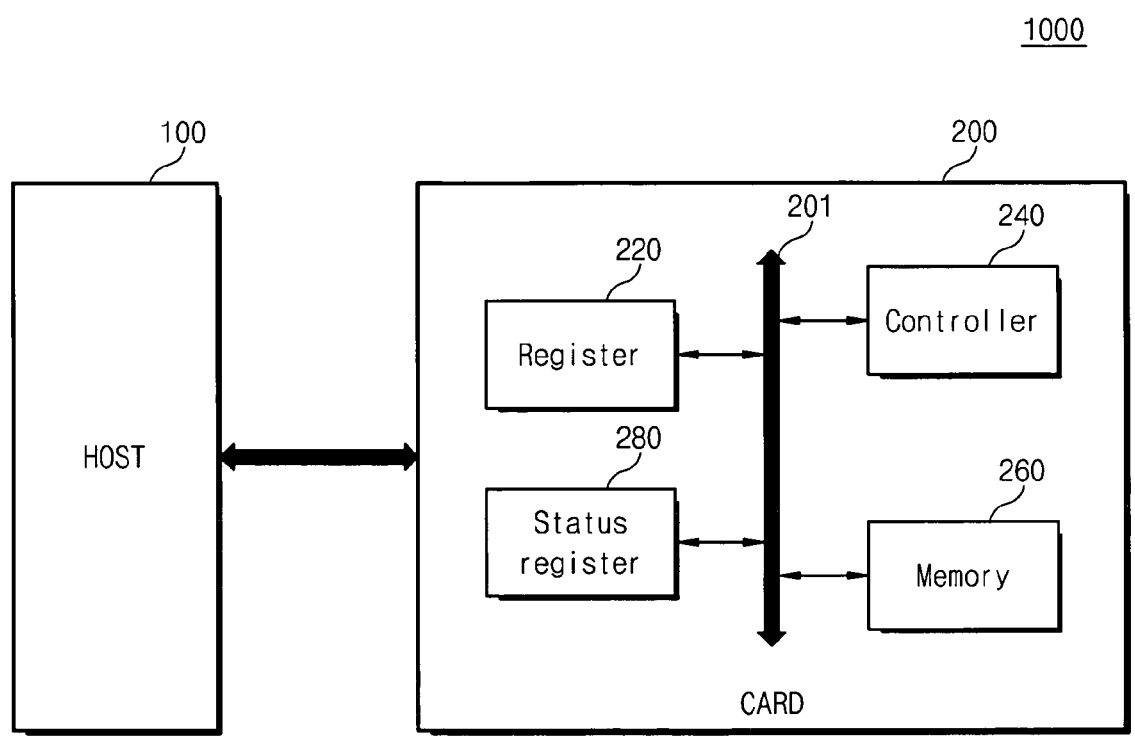
FIG. 1 is a block diagram of a memory card system according to an example embodiment of the present invention.

Referring to FIG. 1, a memory card system 1000 may include a host 100 and a memory card 200. The memory card 200 may be electrically connected to the host 100 and/or electrically isolated therefrom. It should be appreciated by those skilled in the art that an electrical connection of the host 100 and the memory card 200 may be achieved using a variety of interface, for example, but not limited to, PCMCIA, USB, and PS2.

The memory card 200 may have a register 220, a controller 240, a memory 260, and a status register 280 which may be interconnected through a bus 201. The register 220 may be directly accessed by the host 100. In other words, data from the host 100 may be stored in the register 220 under a control of the host 100, and the data stored in the register 220 may be transferred to the host 100 under the control of the host 100. However, it should be apparent to those skilled in the art that an access manner of the register 220 is not limited to the foregoing.

The controller 240 may access the memory 260 in response to a command transferred from the host 100. As an example embodiment, when a read command is transferred from the host 100 to the memory card 200, the controller 240 of the memory card 200 may control the memory 260 to read out data stored in the memory 260 and transfer the read-out data to the host 100. Further, when a write command from the host 100 as well as data to be written is transferred to the memory card 200, the controller 240 of the memory card 200 may control the memory 260 to store the transferred data in the memory 260. Particularly, when data (hereinafter referred to as "test data") is stored in the register 220 under direct control of the host 100, the controller 240 may calculate data stored in the register 220 and may store the calculated data in the register 220.

The controller 240 of the memory card 200 may have a central processing unit (CPU). It should be appreciated that the controller 240 may also have at least a random access memory (RAM), a read-only memory (ROM), an input/output interface circuit, and/or a security data processor. The memory 260 may be a non-volatile memory, such as, for example, a flash memory. In this regard, the memory card 200 may be called a flash memory card. However, it should be appreciated that other types of memory may be employed. Further, it should also be appreciated that other IC cards may apply, such as, but not limited to, smart cards.

The status register 280 may store a ready/busy signal indicating a processing situation of the memory card 200. As an example embodiment, if a read/write command is transferred from the host 100 to the memory card 200, the controller 240 of the memory card 200 may set the status register 280 such that a ready/busy signal indicates a busy state. The ready/busy signal of the status register 280 may be transferred to the host 100, and the host 100 may determine a current processing state of the memory card 200 based on the ready/busy signal.

The operation of the card system according to an example embodiment of the present invention will now be described hereinafter with reference to a flowchart of FIG. 2. A memory card 200 may perform a read operation, a write operation and/or an erase operation according to a command input from a host 100. In an example embodiment, data to be stored and a write command may be transferred from the host 100 to the memory card 200 (S100). A controller 240 of the memory card 200 may control a memory 260 to store the input data in the memory 260 in response to the input write command. The controller 240 may set a status register 280 such that a ready/busy signal may indicate a busy state. If an operation corresponding to an input command is completed, the controller 240 may set the status register 280 such that the ready/busy signal may indicate a ready state.

While a write operation is performed in the memory card 200, the host 100 may determine whether the ready/busy signal outputted from the status register 280 indicates a busy state. If the ready/busy signal indicates a ready state, the host 100 may determine whether the write operation of the ready/busy operation may be normally completed. If the ready/busy signal indicates a busy state, the host 100 may determine whether a process time of the memory card 200 exceeds a reference time (S120).

The reference time may be set in the memory card 200 and/or the host 100. In an example embodiment, when the reference time is set in the controller 240 of the memory card 200, the host 100 may receive the reference time from the memory card 200 when the memory card 200 is electrically connected to the host 100. The reference time may represent a maximum processing time of the memory card 200.

If the processing time of the memory card 200 does not exceed the reference time, the operation proceeds to S110. If the processing time of the memory card 200 exceeds the reference time, the host 100 may write test data into a register 220 of the memory card 200 (S130). The test data may be set to have any value or a fixed value. If the test data is stored in the register 220, the controller 240 may read out the test data stored in the register 220 and may calculate the read-out data according to a determined manner (S140). The operation manner may be, but not limited to, an inverting operation, an XOR operation, an AND operation, and an OR operation. The calculated data may be re-stored in the register 220 by the controller 240.

In S150, the host 100 may read out the data stored in the register 220 using, for example a direct access manner. The host 100 may determine whether the calculated data read out from the host 100 is expected data (S160). If the calculated data read out from the host 100 is expected data, the host 100 may determine whether a ready/busy signal indicates a busy state (S170). If the ready/busy signal indicates a ready state, an operation corresponding to an input command may be normally completed. If the ready/busy signal indicates a busy state, the host 100 may determine whether a processing time of the memory card 200 exceeds a reference time (S180). If the process time of the memory card 200 does not exceed the reference time, the operation may be continuously done. If the process time of the memory card 200 exceeds the reference time, the operation may proceed back to S130.

In S160, if the calculated data read out from the register 220 is not the expected data, the host 100 may initialize the memory card 200 (S190) (e.g., the memory card 200 may fall in an abnormal state although the ready/busy signal indicates a busy state). In other words, if the controller 240 falls in an abnormal state, the controller 240 may not access the test data and/or may not calculate the test data normally although the test data is stored in the register 220. Thus, expected data may not be stored in the register 220. As a result, the memory card 200 may be initialized by the host 100.

As previously stated, the memory card system 100 may present an operation to determine a process situation of the memory card 200. As an example embodiment, when there is no response from the memory card 200 although a maximum processing time may have passed after transferring a command to the memory card 200 (or a ready/busy signal indicates a busy state), the host 100 (e.g., memory card reader) may write test data into the memory card 200. Further, the controller 240 of the memory card 200 may calculate the transferred test data and may re-store the calculated data in the register 220. The host 100 may read out the calculated data stored in the register 220 and may determine whether the calculated data is identical to expected data. If the calculated data is identical to the expected data, the host 100 may determine that the memory card 200 may perform a normal operation corresponding to a previous command. If the calculated data is not identical to the expected data, the host 100 may determine that the memory card 200 (e.g., a CPU of the controller 240 and/or a security data processor) may fall in an abnormal state (e.g., convergent situation). In an example embodiment, the memory card 200 may be initialized by the host 100.

In an example embodiment when a processing time exceeds a reference time (or a maximum processing time of a memory card), S130-S190 may be repeated.

Figure 2:
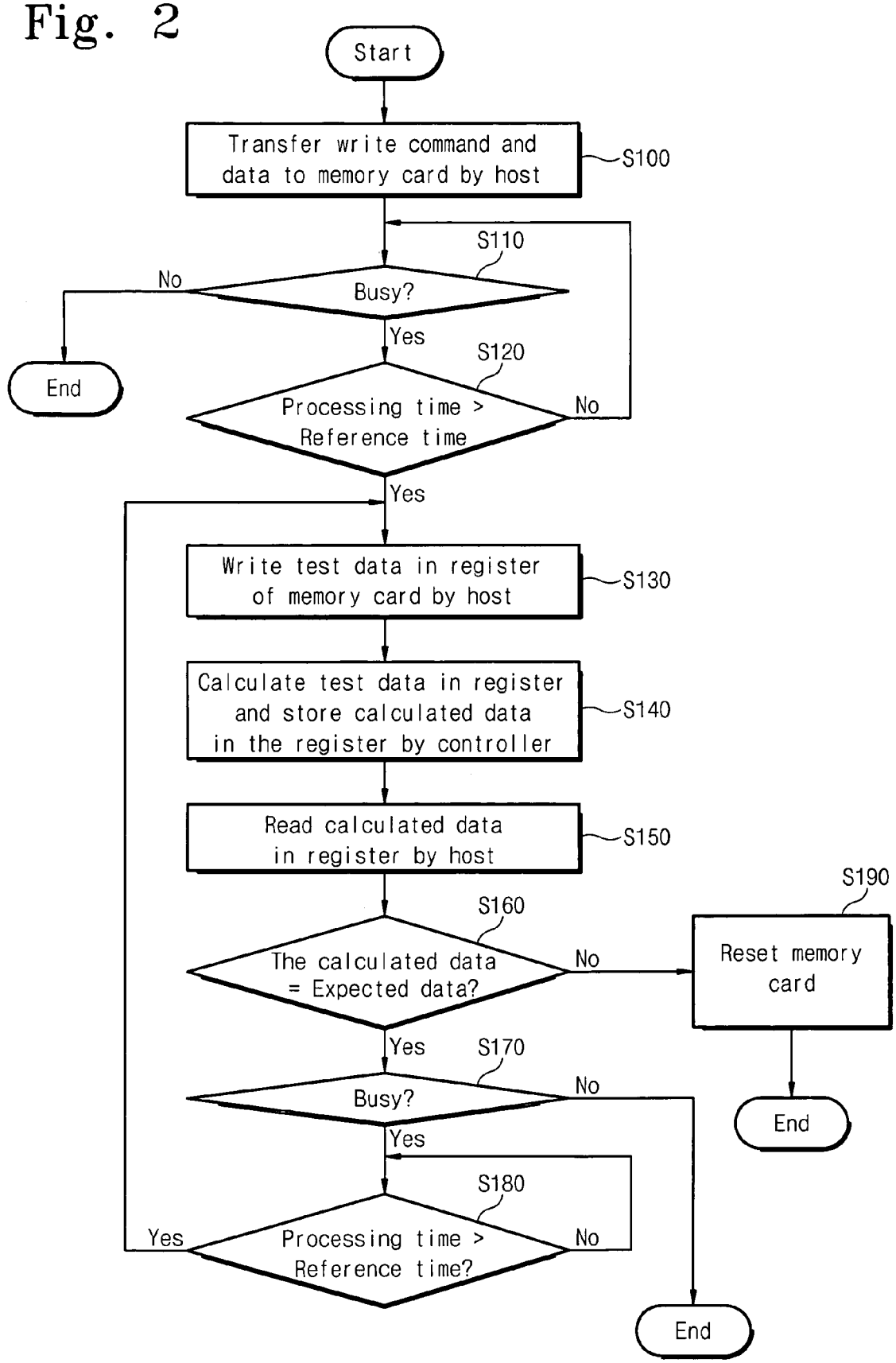
FIG. 2 is a flowchart illustrating an operation of the memory card system, shown in FIG. 1, according to an example embodiment of the present invention.
Figure 3:
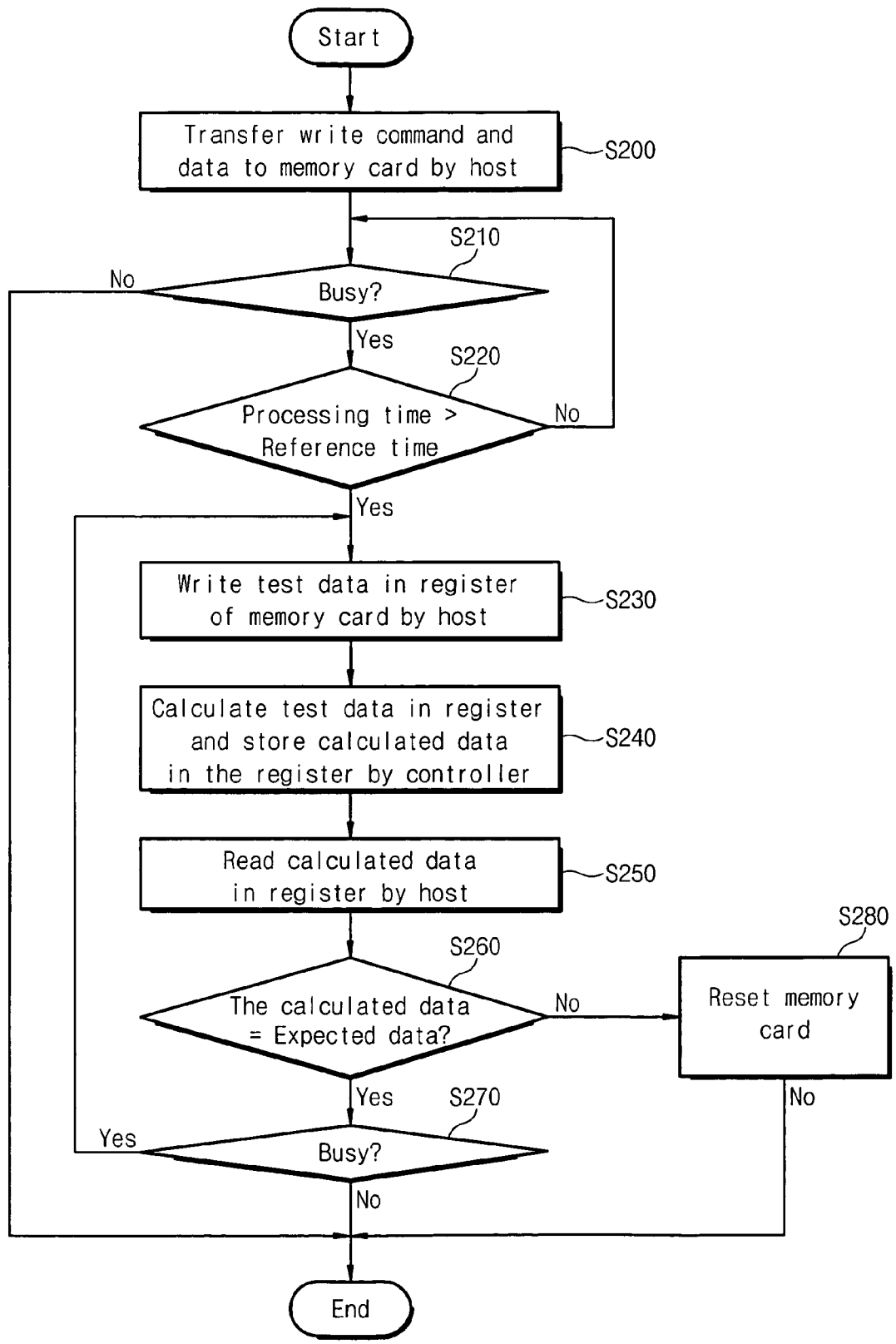
FIG. 3 is a flowchart illustrating an operation of the memory card system, shown in FIG. 1, according to another example embodiment of the present invention.

FIG. 3 illustrates another example embodiment when the processing time exceeds the reference time (or the maximum processing time of the memory card). However, when the processing time exceeds the reference time, the host 100 may perform S130-S170 without the comparing operation of the reference time. The operation illustrated in the flowchart of FIG. 3 may be identical to the operation illustrated in FIG. 2 and will not be described in further detail.

The processing operation (S110, S120) and (S170, S180) as shown in FIGS. 2 and 3 may not be limited to example embodiments of the present invention. In an example embodiment, the register 220 may transfer an interrupt signal to the controller 240 to determine whether test data may be stored in the register 220. Such an interrupt signal may be transferred to a CPU and/or a security data processor constituting the controller 240. The CPU and/or the security data processor may calculate the test data stored in the register 220 in response to the interrupt signal and may re-store the calculated data in the register 220. Such an operation may make it possible to determine an abnormal state of the CPU and/or the security data processor of the memory card 220. In an example embodiment when the register 220 may generate interrupt signals each corresponding to the CPU and/or the security data processor of the controller 240, the host 100 may determine an abnormal state of the CPU and/or the security data processor of the memory card 200.

Although there has been described an operation of a processing situation of a controller 240 (particularly, CPU and/or security data processor) while data is stored in a memory of a memory card 200, the 'determining' operation may be performed in other application operations. For example, an operation corresponding to a command transferred from a host 100 may be performed. A result of such an operation may be temporarily stored in the controller 240. The temporarily stored result may be processed by the controller 240 according to a demand of the host 100. The processed result may be transferred to the host 100. That is, a specific operation may be performed without access to the memory 260. It will be apparent to those skilled in the art that the determining operation of example embodiments of the present invention may be performed during such an operation. In another example embodiment of the memory card system 1000, the memory card 200 may process the data transferred from the host 100 without access to the memory 260 and may re-transfer the processed data to the host 100.

Although the present invention has been described with reference to the example embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. An integrated circuit card system, comprising:
   a host; and
   a memory card for storing test data transferred from the host, wherein
   the host transfers the test data to the memory card when a processing time of the memory card exceeds a reference time,
   the memory card calculates the test data transferred from the host, and
   the host reads out the calculated test data.

2. The integrated circuit card system of claim 1, wherein the memory card further comprises:
   a register configured for storing the test data; and
   a controller for calculating the test data stored in the register and storing the calculated test data in the register.

3. The integrated circuit card system of claim 2, wherein the memory card further comprises a memory controlled by the controller and storing data transferred from the host.

4. The integrated circuit card system of claim 3, wherein the memory is a flash memory.

5. The integrated circuit card system of claim 2, wherein the memory card further comprises a status register for outputting a ready/busy signal.

6. The integrated circuit card system of claim 5, wherein when a command is transferred from the host to the memory card, the status register is set by the controller such that the ready/busy signal indicates a busy state.

7. The integrated circuit card system of claim 2, wherein the controller includes a central processing unit (CPU), a security data processor, a read only memory (ROM), a random access memory (RAM), and an input/output interface circuit.

8. The integrated circuit card system of claim 7, wherein the register is configured for generating an interrupt signal when the test data is stored.

9. The integrated circuit card system of claim 8, wherein the CPU calculates the test data in response to the interrupt signal and stores the calculated data in the register.

10. The integrated circuit card system of claim 7, wherein the host determines whether the calculated data is identical to expected data to determine a normal or abnormal state of a processing situation of the memory card.

11. The integrated circuit card system of claim 10, wherein the host initializes the memory card when the processing situation of the memory card is determined to be in the abnormal state.

12. The integrated circuit card system of claim 8, wherein the security data processor calculates the test data in response to the interrupt signal and stores the calculated data in the register.

13. The integrated circuit card system of claim 2, wherein the register is controlled by the host and the controller.

14. The integrated circuit card system of claim 1, wherein the host transfers the test data to the memory card whenever the processing time of the memory card exceeds the reference time.

15. A memory card, comprising:
    a register configured for storing test data when a processing time of the memory card exceeds a reference time;
    a controller for calculating the test data stored in the register and storing the calculated test data in the register; and
    a memory for storing data transferred from a host.

16. The memory card of claim 15, wherein the memory is controlled by the controller.

17. The memory card of claim 16, wherein the memory is a flash memory.

18. The memory card of claim 15, wherein the register is controlled by the host and the controller.

19. The memory card of claim 18, wherein the register is configured for generating an interrupt signal when the test data is stored.

20. The memory card of claim 15, wherein the memory card further comprises a status register for outputting a ready/busy signal.

21. The memory card of claim 20, wherein when a command is transferred from the host to the memory card, the status register is set by the controller such that the ready/busy signal indicates a busy state.

22. The memory card of claim 15, wherein the controller includes a central processing unit (CPU), a security data processor, a read only memory (ROM), a random access memory (RAM), and an input/output interface circuit.

23. The memory card of claim 22, wherein the CPU calculates the test data in response to the interrupt signal and stores the calculated data in the register.

24. The memory card of claim 22, wherein the security data processor calculates the test data in response to the interrupt signal and stores the calculated data in the register.

25. The memory card of claim 20, wherein the register, the controller, the memory and the status register are connected through a bus.

26. A method for determining a processing state of an integrated circuit card system, comprising:
    transferring a command and data to be stored from a host to a memory card;
    determining whether a processing time of the memory card exceeds a reference time after the command is transferred to the memory card;
    transferring test data to the memory card when the processing time of the memory card exceeds the reference time; and
    determining whether the calculated test data is identical to expected data.

27. The method of claim 26, wherein the memory card sets a ready/busy signal to a busy state when the command is transferred.

28. The method of claim 26, wherein when the calculated test data is not identical to the expected data while the ready/busy signal is kept in the busy signal, the memory card is determined to be abnormal and is initialized.

29. The method of claim 26, wherein the reference time is set by a host.

30. The method of claim 26, wherein the reference time is set by the memory card.

31. The method of claim 26, wherein the test data is stored in a register of the memory card.

32. The method of claim 30, wherein a controller reads out the test data stored in the register and calculates the read-out data in the register.

33. The method of claim 26, wherein determining whether the calculated test data is identical to expected data is performed by the host.

34. The method of claim 33, further comprising re-setting the memory card when the calculated data read out from the register is not the expected data.

35. The method of claim 26, further comprising determining whether a processing time of the memory card exceeds a reference time after the test data is calculated.

36. The method of claim 35, wherein when the processing time of the memory card exceeds the reference time, the operation proceeds to writing a test data in the memory card.

37. The method of claim 35, wherein when the processing time of the memory card does not exceeds the reference time, the operation is repeated.

38. A method for determining a processing state of a memory card, comprising:

(a) determining whether a processing time of the memory card exceeds a reference time after a command is transferred to the memory card;

(b) transferring test data to the memory card when the processing time of the memory card exceeds the reference time, the test data being calculated by the memory card; and (c) determining whether the calculated test data is identical to expected data.

39. The method of claim 38, wherein the memory card sets a ready/busy signal to a busy state when the command is transferred.

40. The method of claim 39, wherein when the calculated test data is not identical to the expected data while the ready/busy signal is kept in the busy signal, the memory card is determined to be abnormal and is initialized.

41. The method of claim 39, wherein when the calculated test data is identical to the expected data while the ready/busy signal is kept in the busy state, operations (b) and (c) are repeated.

42. An integrated circuit card system operated according to the method of claim 26.

43. An integrated circuit card system including a memory card operated according to the method of claim 38.

* * * * *